(12) United States Patent
Pfefferle

(10) Patent No.: US 9,027,352 B2
(45) Date of Patent: May 12, 2015

(54) METHOD FOR IMPROVED EFFICIENCY FOR HIGH HYDROGEN

(75) Inventors: William C. Pfefferle, Branford, CT (US); Lisa Burns, legal representative, Branford, CT (US)

(73) Assignee: Precision Combustion, Inc., North Haven, CT (US)

( * ) Notice: Subject to any disclaimer, the term of this patent is extended or adjusted under 35 U.S.C. 154(b) by 751 days.

(21) Appl. No.: 13/373,344

(22) Filed: Nov. 10, 2011

(65) Prior Publication Data

US 2012/0102965 A1    May 3, 2012

Related U.S. Application Data

(63) Continuation-in-part of application No. 11/977,803, filed on Oct. 25, 2007, now abandoned.

(60) Provisional application No. 60/854,895, filed on Oct. 27, 2006.

(51) Int. Cl.
*F02C 1/00* (2006.01)
*F02C 3/22* (2006.01)
*F02C 6/18* (2006.01)

(52) U.S. Cl.
CPC ... *F02C 3/22* (2013.01); *F02C 6/18* (2013.01); *F05D 2270/082* (2013.01); *Y02E 20/16* (2013.01)

(58) Field of Classification Search
CPC ....... Y02E 20/16; F01K 23/10; F01K 23/101; F01K 23/103; F01K 23/105; F01K 23/106; F01K 23/108; F01K 23/00–23/08; F23R 3/00; F23R 3/002; F23R 3/02; F23R 3/04; F23R 3/045; F23R 3/50; F23R 3/06; F23R 3/08; F23R 3/10; F23R 3/16; F23R 3/26
USPC ................... 60/782, 785, 726, 39.52, 39.182, 60/39.461
See application file for complete search history.

(56) References Cited

U.S. PATENT DOCUMENTS

| | | | |
|---|---|---|---|
| 5,375,996 A | 12/1994 | Nakamura et al. | 431/115 |
| 5,388,395 A * | 2/1995 | Scharpf et al. | 60/781 |
| 6,622,470 B2 | 9/2003 | Viteri et al. | 60/39.52 |
| 7,096,667 B2 * | 8/2006 | Laster et al. | 60/723 |
| 7,581,401 B2 * | 9/2009 | West et al. | 60/772 |
| 8,171,740 B2 * | 5/2012 | Bronson et al. | 60/804 |
| 2005/0022981 A1 | 2/2005 | Helleur | 165/108 |
| 2005/0150231 A1 * | 7/2005 | Laster et al. | 60/777 |
| 2006/0059892 A1 | 3/2006 | Hu et al. | 60/274 |
| 2008/0127651 A1 * | 6/2008 | Zupanc et al. | 60/752 |
| 2010/0024432 A1 * | 2/2010 | Pfefferle | 60/780 |
| 2010/0242483 A1 * | 9/2010 | Snyder et al. | 60/748 |

* cited by examiner

*Primary Examiner* — Craig Kim

(57) ABSTRACT

A method for operating a hydrogen-fueled gas turbine is provided wherein a supply of fuel is passed to a gas turbine combustor, and a supply of nitrogen and sufficient air to provide at least sufficient compressed air to the gas turbine for fuel combustion is passed to a compressor. A sufficient portion of the compressor discharge flow is passed to a combustor for fuel rich combustion of the fuel flow to the combustor and the fuel is combusted to produce hot combustion gases that are, in turn, passed to a turbine.

16 Claims, 1 Drawing Sheet

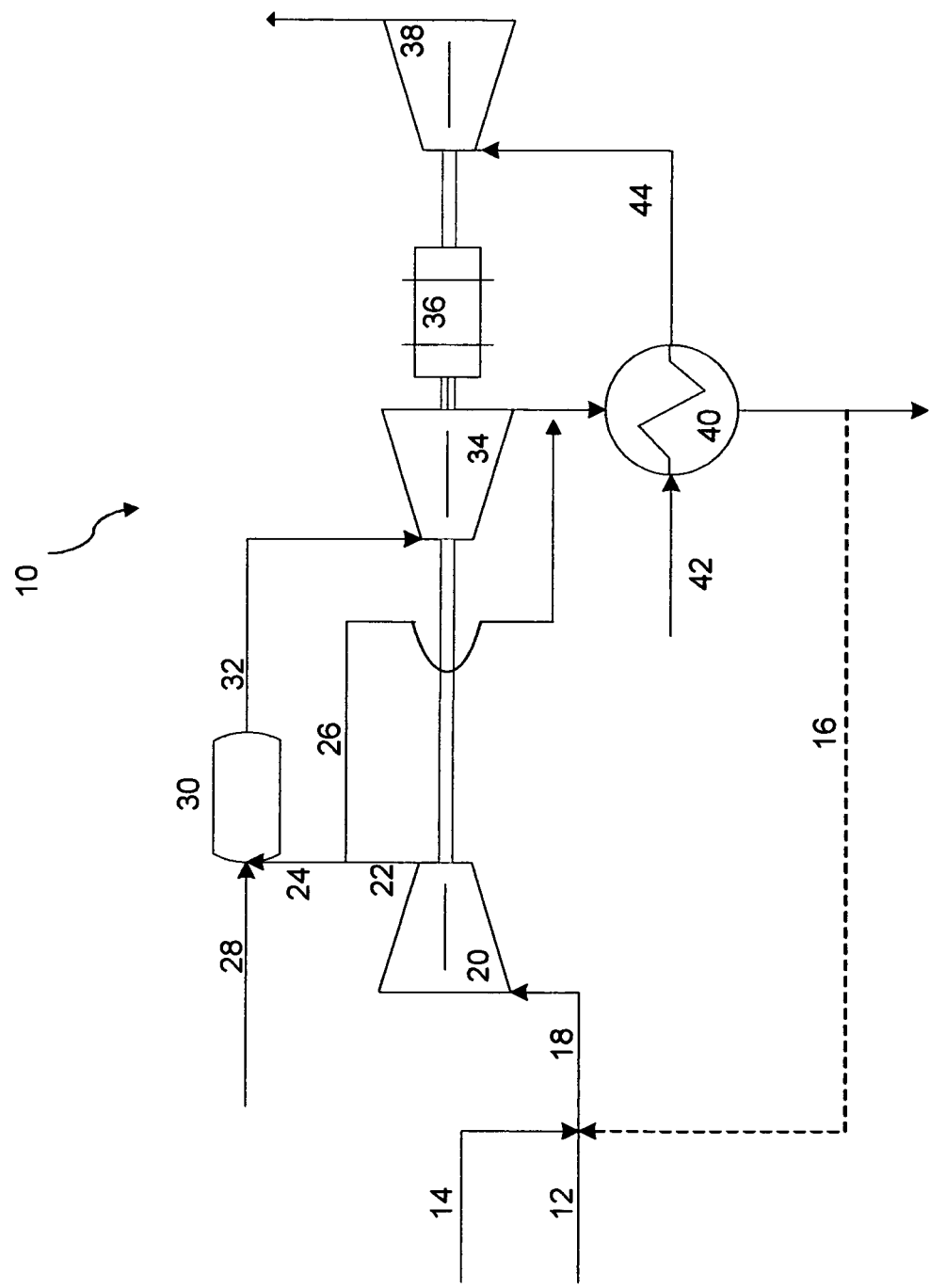

METHOD FOR IMPROVED EFFICIENCY FOR HIGH HYDROGEN

CROSS-REFERENCE TO RELATED APPLICATION

This application claims the benefit of U.S. Provisional Application No. 60/854,895 filed Oct. 27, 2006. This application also is a Continuation-In-Part of U.S. application Ser. No. 11/977,803 filed Oct. 25, 2007 now abandoned.

BACKGROUND OF THE INVENTION

1. Field of the Invention

The present invention relates to a method of achieving ultra-low NOx without sacrificing thermal efficiency for hydrogen fueled gas turbines. In particular, the present invention comprises a method for minimizing the need to extract compressor discharge air to limit mass flow through the power turbine, as is typically required in low NOx systems to maintain turbine rotor stress levels within acceptable limits. Systems of the present invention allow increased turbine inlet temperature, further improving system efficiency.

2. Brief Description of the Related Art

With energy usage directly related to economic growth, there has been a steady increase in the need for increased energy supplies. In the U.S., coal is abundant and low in cost. Unfortunately, conventional coal-fired steam plants, which are a major source of electrical power, are inefficient and pollute the air. Thus, there is a pressing need for cleaner, more efficient coal-fired power plants.

Accordingly, Integrated Gasification Combined-Cycle (IGCC) systems have been developed which can achieve significantly improved efficiencies in comparison to conventional steam plants. In such a system, syngas (a mixture comprising hydrogen and carbon monoxide) is produced by partial oxidation of coal or other carbonaceous fuel. This allows cleanup of sulfur and other impurities before combustion. Further, the carbon monoxide can be reacted with steam using the water gas shift reaction to form carbon dioxide and hydrogen. Carbon dioxide may then be recovered using conventional technologies known in the art. This allows pre-combustion recovery of carbon dioxide for sequestration and produces a high hydrogen content fuel. Gas turbines may also be powered by hydrogen produced in heavy oil recovery for upgrading the oil and in various chemical processes as a by-product.

Regardless of the source or purity, hydrogen poses an emission problem on combustion. Even without removal of carbon from syngas, the hydrogen content of the gas is typically too high to allow use of conventional dry low NOx premixed combustion for NOx control. Hydrogen ignition delay is short and the flame speed is high. Therefore, diffusion flame combustion is used with diluent added to the gas to minimize NOx by lowering the adiabatic flame temperature. Even so, exhaust gas cleanup may still be required. Thus, such systems cannot achieve present standards for NOx emissions without removal of NOx from the exhaust gas and the consequent efficiency loss. Improved combustion systems are needed.

There are further efficiency loss issues. If nitrogen is used to dilute the fuel gas, there is an energy penalty for nitrogen compression to the pressure needed for mixing with the fuel gas. Typically, avoiding excessive loads on the turbine rotor requires operation at a reduced turbine temperature and/or bleed of compressed air from the turbine compressor.

It is therefore an object of the present to provide a method for achieving ultra low NOx emissions in combustion of high purity hydrogen and syngas in gas turbines. It also an object of the present invention to provide a method for improving the thermal efficiency of power systems wherein the fuel comprises hydrogen.

DESCRIPTION OF THE INVENTION

The present invention is a method for achieving ultra low NOx emissions in combustion of high purity hydrogen and syngas in gas turbines. It also provides a method for improving the thermal efficiency of power systems wherein the fuel comprises hydrogen. The term "hydrogen" as used herein includes both hydrogen and syngas. The present invention uses non-premixed combustion of hydrogen at fuel-air ratios slightly greater than stoichiometric. It has now been found that by reducing the oxygen content of the inlet air to the amount needed to achieve the desired combustor temperature, even a modest excess of fuel provides significant reduction in NOx. Although conceived for fuels where lean premixed combustion poses problems, conventional fuels may be used. Levels below two ppm are readily achievable using a conventional diffusion flame combustor. No diluent need be added to the fuel and thus there is no increase in mass flow.

In sum, a supply of hydrogen is passed to a gas turbine combustor. A supply of nitrogen is made available. Sufficient air to provide at least sufficient compressed air to the gas turbine for fuel combustion is passed to a compressor along with the nitrogen. A sufficient portion of the compressor discharge flow is passed to a combustor for fuel rich combustion of the hydrogen fuel flow to the combustor. The fuel is combusted to produce hot combustion gases that are, in turn, passed to a turbine. Additional air may be added downstream of the turbine for burn-out of residual fuel values. A portion of the compressor discharge may be used for turbine cooling. In order to achieve improved thermal efficiency, the turbine may be operated at a higher turbine inlet temperature than would be used with nitrogen diluted syngas fuel or with steam diluted syngas fuel.

In the present invention, high hydrogen fuels may be used, even seventy percent or higher. In IGCC systems with CO2 removal, the de-carbonated hydrogen fuel may be used as-is. Low NOx is achieved as illustrated below.

The following example assumes use of pure hydrogen.

Turbine:- press ratio- 17/1        Comb. Temp. −1737 Kelvin
    Air Inlet- 700 Kelvin        Phi 1.04
    Air composition- 0.21 moles O2 per 2.4 moles N2
      Equilibrium NOx- 1.4 ppm In contrast to the above, operating at stoichiometric (Phi=1.0) yields an equilibrium NOx of 55 ppm. At a lean Phi of 0.99, NOx is 200 ppm.

The nitrogen can be available at a temperature much lower than ambient air temperature, and compressor inlet temperature can be maintained at a value for maximum efficiency and power even at high ambient air temperatures. This improves system efficiency. If no nitrogen or steam diluent is added to the fuel, no reduction in turbine inlet temperature is needed to compensate for the resulting increased mass flow through the gas turbine, and there is no need to bleed off compressor discharge air to reduce turbine mass flow combustion. In the present invention, cooled turbine exhaust gases may be used substitute for all or a portion of the nitrogen diluent stream. Although the above example is for only four percent excess fuel, it is typically advantageous to use greater excess, for example thirty percent (Phi of 1.3) to allow rich operation at part load.

BRIEF DESCRIPTION OF THE DRAWINGS

FIG. 1 depicts a typical combined cycle system of the present invention.

DETAILED DESCRIPTION OF THE INVENTION

A typical combined cycle system 10 of the present invention is depicted schematically in FIG. 1. As shown, gas turbine air flow 12 is joined by nitrogen feed 14 and optionally exhaust gas recycle stream 16 forming mixed air stream 18. Mixed air stream 18 is compressed within compressor 20 to gas turbine operating parameters. Compressor discharge 22 is split into combustor primary air 24 and after burner air stream 26. Fuel stream 28 is fed to combustor 30 for rich non-premixed combustion with primary air 24 to produce hot combustion gases or a primary combustion product stream 32, which, in turn, is passed to turbine 34. Air stream 26 may be added downstream of turbine 34 in sufficient quantity to combust all residual fuel values in primary combustion product stream 32.

As depicted in FIG. 1, combined cycle system 10 may further comprise generator 36, steam turbine 38, and heat recovery boiler 40 to which is passed water 42 and from which is exhausted steam 44.

Although the invention has been described in detail with respect to passing a nitrogen feed into a turbine air flow, it will be apparent that the invention is capable of modifications and variations, apparent to those skilled in the art, without departing from the spirit and scope of the invention.

The invention claimed is:

1. A method of operating a hydrogen-fueled gas turbine comprising:
    a) passing a supply of fuel to a gas turbine combustor;
    b) passing a supply of air comprising oxygen and nitrogen to a gas turbine compressor;
    c) passing an additional supply of nitrogen to the gas turbine compressor;
    d) compressing the additional supply of nitrogen and the air to provide a compressor discharge flow;
    e) passing a portion of the compressor discharge flow to the gas turbine combustor;
    f) combusting the supply of fuel with the portion of the compressor discharge flow in the gas turbine combustor under fuel rich conditions such that a fuel to air ratio is greater than stoichiometric, so as to produce a primary combustion product stream comprising residual fuel values;
    g) passing the primary combustion product stream to the gas turbine for expansion; and
    h) mixing additional air with the primary combustion product stream downstream of the gas turbine, and combusting the resulting mixture of the primary combustion product stream and the additional air to remove the residual fuel values in the primary combustion product stream.

2. The method of claim 1 wherein the supply of fuel in the gas turbine combustor is combusted in a diffusion flame.

3. The method of claim 1 wherein the combustion of residual fuel values in the primary combustion product stream provides a heated turbine exhaust and said exhaust is passed to a combined cycle heat recovery system.

4. A method of operating a hydrogen fueled gas turbine comprising:
    a) passing a supply of fuel to a gas turbine combustor;
    b) passing a supply of air comprising oxygen and nitrogen to a gas turbine compressor;
    c) passing an additional supply of low pressure nitrogen to the gas turbine compressor;
    d) compressing the additional supply of nitrogen and the air to provide a compressor discharge flow;
    e) passing a portion of the compressor discharge flow to the gas turbine combustor;
    f) combusting the supply of fuel and the portion of the compressor discharge flow in the gas turbine combustor under fuel rich conditions such that a fuel to air ratio is greater than stoichiometric, so as to produce a primary combustion product stream comprising residual fuel values;
    g) passing the primary combustion product stream to the gas turbine; and
    h) mixing additional air with the primary combustion product stream downstream of the gas turbine, and combusting the resulting mixture of the primary combustion product stream and the additional air to remove the residual fuel values in the primary combustion product stream.

5. The method of claim 4 wherein the combustion of residual fuel values in the primary combustion product stream provides a heated turbine exhaust and said exhaust is passed to a combined cycle heat recovery system.

6. The method of claim 4 wherein the supply of fuel to the gas turbine combustor comprises syngas.

7. The method of claim 4 wherein the supply of fuel in the gas turbine combustor is combusted in a diffusion flame.

8. The method of claim 1 wherein the supply of fuel passing to the gas turbine combustor comprises syngas.

9. The method of claim 1 wherein the supply of fuel passing to the gas turbine combustor comprises 70 percent or greater of hydrogen.

10. The method of claim 1 wherein the supply of fuel and the portion of the compressor discharge flow passing to the gas turbine combustor are non-premixed.

11. The method of claim 1 wherein in step (h) the additional air is provided as a remaining portion of the compressor discharge flow comprising air and the additional supply of nitrogen.

12. The method of claim 3 wherein a cooled turbine exhaust is recovered from the combined cycle heat recovery system, and a portion of said cooled turbine exhaust is recycled to the gas turbine compressor.

13. The method of claim 4 wherein the supply of fuel passing to the gas turbine combustor comprises 70 percent or greater of hydrogen.

14. The method of claim 4 wherein the supply of fuel and the portion of the compressor discharge flow passing to the gas turbine combustor are non-premixed.

15. The method of claim 4 where in step (h) the additional air is provided as a remaining portion of the compressor discharge flow comprising air and the additional supply of nitrogen.

16. The method of claim 5 wherein a cooled turbine exhaust is recovered from the combined cycle heat recovery system, and a portion of said cooled turbine exhaust is recycled to the gas turbine compressor.

* * * * *